(12) United States Patent  
Fujimura et al.

(10) Patent No.: US 7,721,526 B2
(45) Date of Patent: May 25, 2010

(54) TURBOFAN ENGINE

(75) Inventors: Tetsuji Fujimura, Tokyo (JP); Ikuhisa Mizuta, Tokyo (JP); Kuniyuki Imanari, Tokyo (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 413 days.

(21) Appl. No.: 11/427,107

(22) Filed: Jun. 28, 2006

(65) Prior Publication Data

US 2008/0000216 A1 Jan. 3, 2008

(51) Int. Cl.
*F02K 1/38* (2006.01)

(52) U.S. Cl. .................................. 60/262; 416/245 R (58) Field of Classification Search ............... 60/226.1, 60/262; 415/143, 199.3, 199.4; 416/245 R, 416/175, 203, 198 A, 200 A, 201 R
See application file for complete search history.

(56) References Cited

U.S. PATENT DOCUMENTS

| | | | | |
|---|---|---|---|---|
| 1,779,186 A | * | 10/1930 | Jan Pavlecka | ................. 416/94 |
| 2,398,203 A | | 4/1946 | Browne | |
| 2,936,948 A | | 5/1960 | Eck | |
| 3,075,743 A | * | 1/1963 | Sheets | ......................... 415/220 |
| 3,734,649 A | * | 5/1973 | Sandy, Jr. | .................... 417/370 |
| 3,794,444 A | | 2/1974 | Campbell et al. | |
| 4,183,719 A | | 1/1980 | Bozung | |
| 4,257,743 A | * | 3/1981 | Fujii | ........................ 416/196 R |
| 5,403,165 A | * | 4/1995 | Lehe et al. | .................. 417/406 |
| 6,145,300 A | * | 11/2000 | Romani | ....................... 60/226.1 |
| 6,398,499 B1 | * | 6/2002 | Simonetti et al. | ......... 416/193 A |
| 6,722,847 B2 | * | 4/2004 | Freeman et al. | ........... 415/199.4 |
| 6,935,840 B2 | | 8/2005 | Romani et al. | |
| 2002/0194834 A1 | | 12/2002 | Springer | |
| 2006/0059887 A1 | * | 3/2006 | Klingels et al. | ................ 60/204 |

FOREIGN PATENT DOCUMENTS

| | | |
|---|---|---|
| JP | 48-2660 | 1/1973 |
| JP | 4-1637 | 1/1992 |
| JP | 05-180194 | 7/1993 |
| JP | 8-149419 | 7/1996 |
| JP | 11-22486 | 1/1999 |
| JP | 2001-271792 | 10/2001 |
| JP | 2004-027854 | 1/2004 |
| JP | 2004-137950 | 5/2004 |
| JP | 2005-315138 | 11/2005 |

OTHER PUBLICATIONS

Office Action issued in related co-pending U.S. Appl. No. 11/568,141, mailed May 5, 2009.
Office Action issued in corresponding U.S. Appl. No. 11/568,141, dated Nov. 10, 2009.

* cited by examiner

*Primary Examiner*—Michael Cuff
*Assistant Examiner*—Andrew Nguyen
(74) *Attorney, Agent, or Firm*—Griffin & Szipl, P.C.

(57) ABSTRACT

A turbofan engine has a fan on a front side thereof and a turbine driving the fan. The turbofan engine includes a disk rotationally driven by the turbine, a spinner detachably mounted at a front side of the disk, a spiral blade integrally mounted on a surface of the spinner, and a rear moving blade detachably mounted on an outer circumferential surface of the disk. The spiral blade and the rear moving blade form a first-stage moving blade of the fan.

13 Claims, 7 Drawing Sheets

FIG.1

PRIOR ART

TURBOFAN ENGINE

BACKGROUND OF THE INVENTION

1. Field of the Invention

The present invention relates to a turbofan engine of a type having a zero hub tip ratio fan structured such that a hub/tip ratio in the first-stage moving blade of a fan can be set to approximately 0.

2. Description of Related Art

Figure 1:
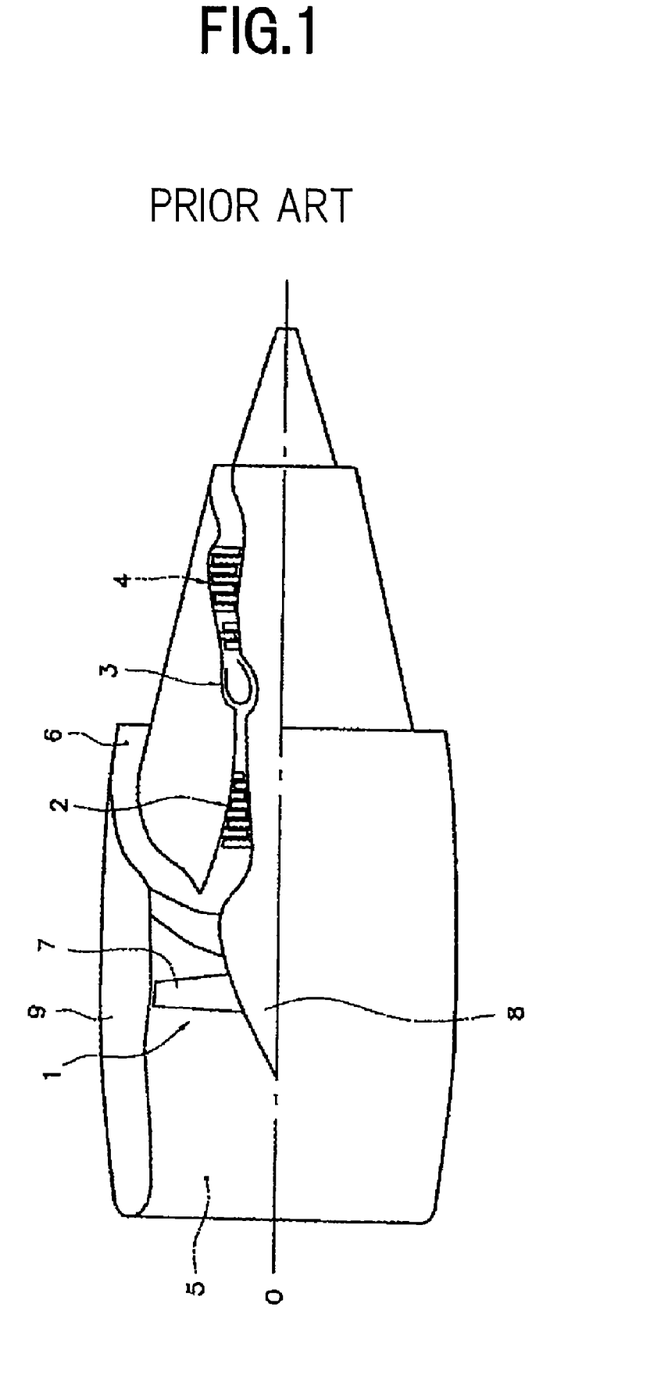
FIG. 1 is a partially cut side view showing an outline of an example of a high-bypass turbofan engine.

As outlined in FIG. 1, a high-bypass turbofan engine that is one of jet engines is structured such that a fan 1, a compressor 2, a combustor 3 and a turbine 4 are arranged in an axial direction (shown by an axis O) of the turbine in such order from a front side. Air is taken from an inlet (an air intake) 5 in a front surface by rotation of the fan 1 driven by the turbine 4. Most of the air is injected from a bypass duct 6 so as to generate a driving force, and a part of the rest of the air is compressed by the compressor 2 driven by the turbine 4. Fuel is burnt in the combustor 3 by the compression air, and the turbine 4 is driven by the high-speed combustion air flow generated at the time of the combustion.

In this kind of high-bypass turbofan engine, there has been known that an average speed of an exhaust gas can be decreased by making the bypass ratio large, thereby contributing to reduction of specific fuel consumption and reduction of an exhaust gas noise.

In this case, the fan 1 in the prior-art high-bypass turbofan engine is structured such that a base portion (end portion at rotational center side) of the first-stage moving blade (the up-front fan moving blade) 7 is embedded in an outer circumferential surface of a spinner 8 rotationally driven by the turbine 4. For this reason, certain degree of hub/tip ratio (a ratio of a hub diameter to a tip diameter facing to the inlet 5) is necessary. The hub/tip ratio is generally set to about 0.3.

Accordingly, when the bypass ratio in the high-bypass turbofan engine is enlarged to achieve a lower specific fuel consumption and a lower noise, there is a problem that not only a diameter of the first-stage moving blade 7 of the fan but also an inner diameter of a casing 9 surrounding the first-stage moving blade of the fan becomes large, causing increase of an engine weight.

Figure 2:
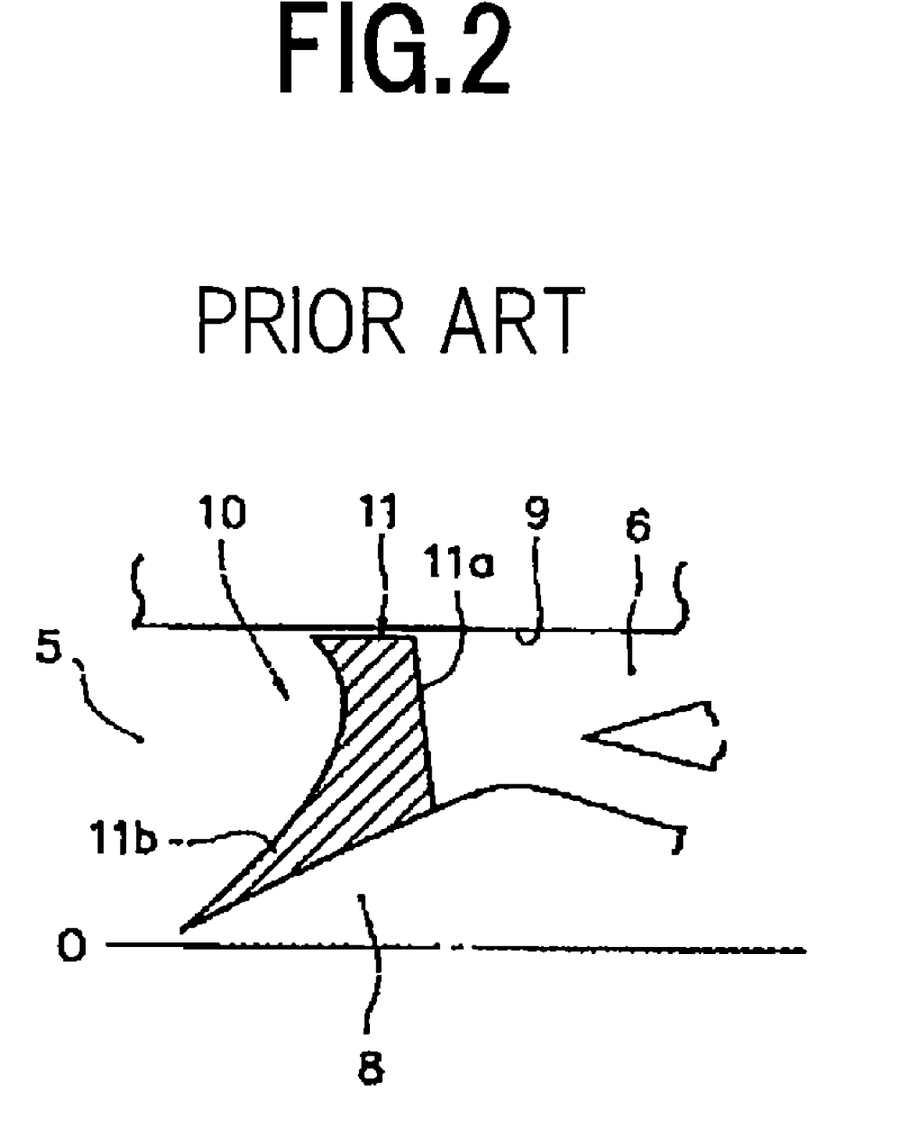
FIG. 2 is a schematic sectional side view showing a main portion of a zero hub tip ratio fan type turbofan engine proposed by the applicant of the present invention.

In view of the above problem, the applicant of the present invention has proposed a type of a turbofan engine equipped with a fan (hereinafter, refer to as a zero hub tip ratio fan) 10 structured such that a hub/tip ratio can be set to 0, as shown in FIG. 2 (for example, refer to Patent Document 1: Japanese Laid-Open Patent Publication No. 2004-27854).

As for this zero hub tip ratio fan 10, a front side of a base portion of a rear moving blade portion 11a arranged in an outer periphery of the spinner 8 (rotationally driven by the turbine 4 in the same manner as the first-stage moving blade 7 of the fan shown in FIG. 1) is spirally extended toward an axial position of the front end portion so as to form a spiral blade portion 11b. Thereby, the first-stage moving blade 11 of the fan is formed at a front portion of the spinner 8 with the hub diameter set to 0.

Accordingly, in the turbofan engine of the zero hub tip ratio fan type, since the air can be sucked from the front surface of the spinner 8 by the spiral blade portion 11b, and is compressed so as to be supplied to the rear moving blade portion 11a, it is possible to set an entire area in front of the engine as an air inflow area of the first-stage moving blade 11 of the fan. Therefore, since it is possible to increase a mass flow rate of the first-stage moving blade 11 of the fan without enlarging the diameter of the fan and the inner diameter of the casing, it is possible to keep the diameter of the fan small even in the case where the bypass ratio is enlarged, and it is possible to reduce weight of the engine.

However, in the prior-art zero hub tip ratio fan type turbofan engine as shown in FIG. 2, the first-stage moving blade 11 of the fan in the zero hub tip ratio fan 10 is structured such that the spiral blade portion 11b and the rear moving blade portion 11a are integrated so as to be smoothly connected. For this reason, in order to arrange the first-stage moving blade of the fan having such a blade shape in the front portion of the spinner 8, it is necessary to employ a so-called brisk structure in which the front portion of the spinner 8 and the first-stage moving blade 11 of the fan are integrated. In this case, for example, when a part of the first-stage moving blade 11 of the fan is broken due to a bird strike or the like, it is necessary to replace an entire of the brisk structure. Accordingly, there is a disadvantage from the standpoint of maintainability.

Further, in the case of manufacturing the front portion of the spinner 8 and the first-stage moving blade 11 of the fan as the brisk structure, it is necessary to perform an integral molding by a cutting or the like. However, since the brisk structure is large scale structure including an entire of the first-stage moving blade 11 of the fan and the front portion of the spinner 8, manufacturing costs become high.

SUMMARY OF THE INVENTION

Accordingly, an object of the present invention is to provide a zero hub tip ratio fan type turbofan engine in which when a part of a fan moving blade or the like is broken, the broken portion can be repaired by replacing a member corresponding to the broken portion, whereby it is possible to improve maintainability, and to decrease a manufacturing cost.

In order to achieve the above problem, according to a first aspect of the present invention, there is provided a turbofan engine having a fan on a front side thereof and a turbine driving the fan, comprising:

a disk rotationally driven by the turbine;

a spinner detachably mounted at a front side of the disk;

a spiral blade integrally mounted on a surface of the spinner; and a rear moving blade detachably mounted on an outer circumferential surface of the disk;

wherein the spiral blade and the rear moving blade form a first-stage moving blade of the fan.

Further, according to a second aspect of the present invention, there is provided a turbofan engine having a fan on a front side thereof and a turbine driving the fan, comprising:

a disk that is rotationally driven by the turbine and that has an engagement groove extending in an axial direction at a plurality of positions of an outer circumferential portion thereof;

a rear moving blade that includes a base portion having a dovetail portion extending in a front-to-rear direction, the dovetail portion being detachably fitted into the engagement groove from a front side;

a spinner detachably mounted at a front side of the disk; and a spiral blade integrally mounted on a surface of the spinner;

wherein the spiral blade and the rear moving blade form a first-stage moving blade of the fan.

Further, the turbofan engine of the second aspect of the present invention preferably comprises a retainer integrally provided in a rear end portion of the spinner so that the dovetail portion of the rear moving blade fitted into the engagement groove from the front side is prevented from being displaced to the front side.

Preferably, the turbofan engine of the first or second aspect of the present invention comprises comprising a cushioning member for sealing in a rear end edge portion of the spiral blade and in a front end edge portion close to a base of the rear moving blade.

Preferably, the turbofan engine of the first or second aspect of the present invention comprises:

a first vibration interfering projection at one or more positions in the rear end portion of the spiral blade; and a second vibration interfering projection at one or more positions at the front end portion close to a base of the rear moving blade, for colliding with the first vibration interfering projection when blade vibration occurring at the spiral blade and the rear moving blade is different therebetween.

According to the turbofan engine of the present invention, the following excellent effects can be achieved.

(1) In the turbofan engine having a fan on a front side thereof and a turbine driving the fan, the spinner integrally having the spiral blade in the surface thereof is detachably mounted to the front side of the disk which is rotationally driven by the turbine, the rear moving blade is detachably mounted to the outer circumferential surface of the disk, and the first-stage moving blade of the fan is formed by the divided spiral blade and rear moving blade. The air is sucked from the front surface of the spinner by the spiral blade of the spinner surface in accordance with the rotation of the first-stage moving blade of the fan, and the air can be supplied to the rear moving blade in a compressed state. Accordingly, it is possible to set the entire area in the front side of the engine as the air inflow area of the first-stage moving blade of the fan, and it is possible to increase the suction flow rate of the first-stage moving blade of the fan without enlarging the diameter of the fan and the inner diameter of the casing. Further, when a part of the rear moving blade is broken, it is possible to replace the rear moving blade with a new rear moving blade by detaching only the broken rear moving blade from the disk. Further, when the spiral blade is broken, it is possible to repair the spiral blade by detaching the spiral blade integrally with the spinner and thereafter attaching the spinner with a new spiral blade. Accordingly, excellent maintainability can be obtained.

(2) In the turbofan engine having a fan on a front side thereof and a turbine driving the fan, the engagement groove extending in the axial direction is provided at a plurality of positions of an outer circumferential portion of a disk which is rotationally driven by the turbine, the dovetail portion provided in the base portion of the rear moving blade so as to extend in the front-to-rear direction is detachably fitted to the engagement groove of the disk from the front side, the spinner integrally having the spiral blade in the surface thereof is detachably mounted to the front side of the disk, and the first-stage moving blade of the fan is formed by the divided spiral blade and rear moving blade. Thereby, it is possible to attach and detach the spinner with respect to the disk, and attach and detach the rear moving blade from the front side of the engine, in addition to the same effect as the item (1) mentioned above. Accordingly, maintainability can be further improved.

(3) Further, the retainer is integrally provided in the rear end portion of the spinner, thereby preventing the dovetail portion of the rear moving blade engaged with the engagement groove of the disk from the front side, from being displaced to the front side. Accordingly, it is not necessary to independently prepare and attach the retainer member for preventing the rear moving blade from moving. As a result, it is possible to reduce a labor hour required for the maintaining work, and it is possible to reduce the number of the members.

(4) Since the cushioning member for sealing is provided in the rear end edge portion of the spiral blade, and the front end edge portion close to the base of the rear moving blade, it is possible to suppress a turbulence of the air flow caused by the divided structure of the spiral blade and the rear moving blade constituting the first-stage moving blade of the fan.

(5) Since the vibration interfering projections for colliding with each other when the different blade vibrations are generated in the spiral blade and the rear moving blade are respectively provided the desired one or more positions in the rear end portion of the spiral blade and the front end portion close to the base of the rear moving blade, it is possible to absorb vibration energy of the vibrations of the spiral blade and the rear moving blade by interfering the projections for interfering the vibration with each other, when the blade vibration is generated in the spiral blade and the rear moving blade at the time of operating the engine. Therefore, it is possible to suppress increase of the blade vibration caused by the divided structure of the spiral blade and the rear moving blade constituting the first-stage moving blade of the fan.

The other objects and advantageous features of the present invention will be apparent from the following description with reference to the accompanying drawings.

DESCRIPTION OF THE PREFERRED EMBODIMENTS

A description will be given below of a best mode for carrying out the present invention with reference to the accompanying drawings.

Figure 3A:
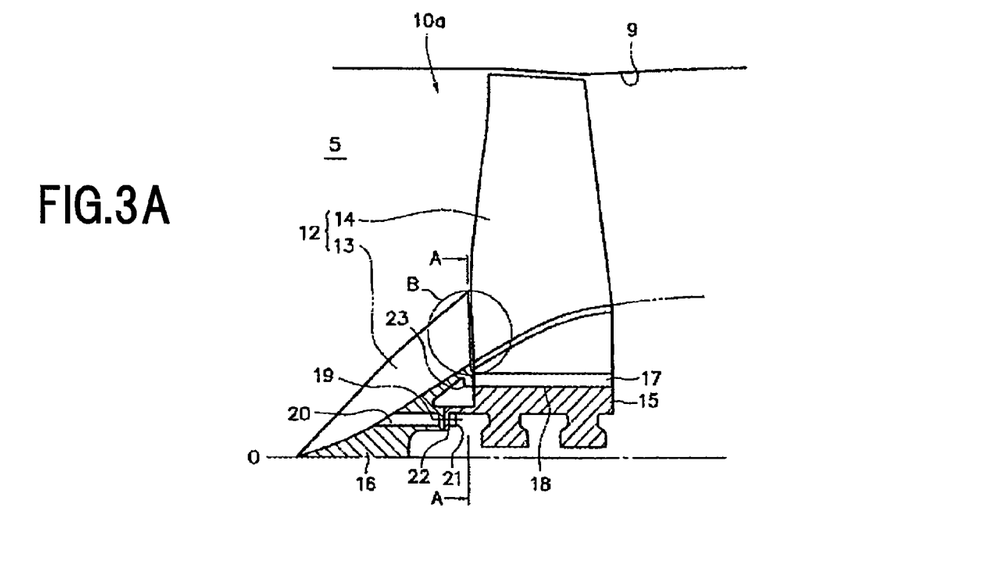
FIG. 3A is a schematic sectional side view showing an embodiment of a turbofan engine according to the present invention.
Figure 3B:
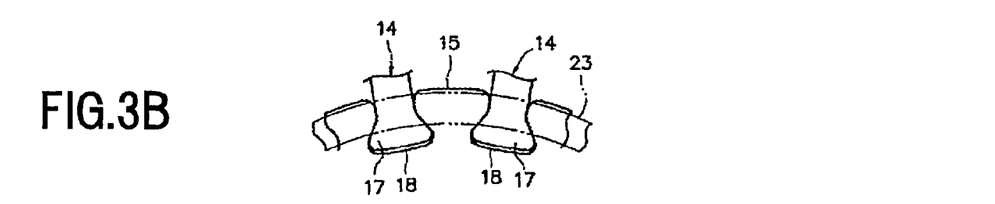
FIG. 3B is an enlarged view as seen from an arrow AA in FIG. 3A.
Figure 3C:
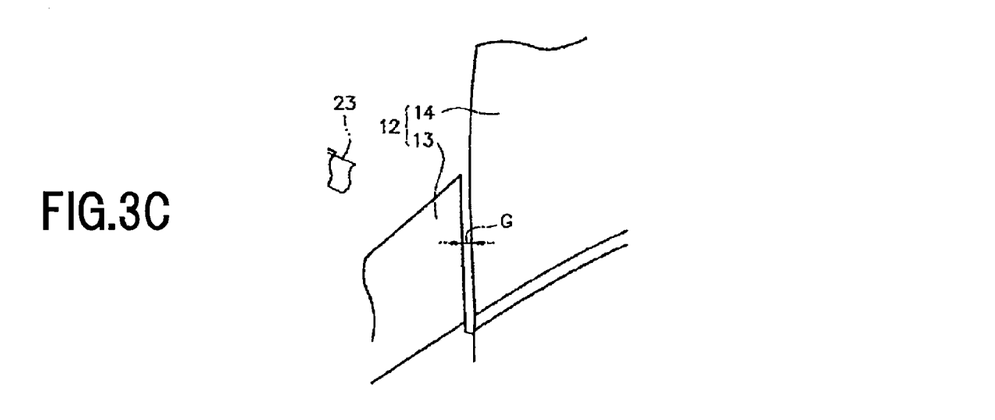
FIG. 3C is an enlarged view of a portion B in FIG. 3A.

FIGS. 3A, 3B and 3C show an embodiment of a turbofan engine in accordance with the present invention. In the same structure as the zero hub tip ratio type turbofan engine shown in FIG. 2, a zero hub tip ratio fan 10a in the present invention is structured as a first-stage moving blade 12 of the fan having a divided structure formed in the same blade shape as the first-stage moving blade 11 of the fan shown in FIG. 2. This divided structure is divided into two sections in a front-to-rear direction at a desired position in an axial direction and constituted by a spiral blade 13 in a front side and a rear moving blade 14 in a rear side. The rear moving blade 14 is detachably mounted on an outer circumferential portion of a disk 15 arranged in a front portion of the engine and rotationally driven by a turbine 4 (refer to FIG. 1). On the other hand, the spiral blade 13 is structured so as to be integrally attached to a surface of a spinner 16 detachably mounted on a front side of the disk 15.

Describing in detail, in order to detachably mount the rear moving blade 14 on the outer circumferential portion of the disk 15, as shown in FIGS. 3A and 3B, for example, a dovetail portion 17 extending in a front-to-rear direction is provided in a base portion of the rear moving blade 14. On the other hand, an engagement groove (a dovetail groove) 18 is provided at a lot of positions having a desired interval in a circumferential direction in an outer circumferential edge portion of the disk 15. The engagement groove 18 extends in an axial direction such that a front end of the engagement groove 18 is open to a front side. The dovetail portion 17 is fitted into the engagement groove 18. The rear moving blades 14 are respectively detachably mounted on the outer circumferential portion of the disk 15 by inserting the dovetail portions 17 of the rear moving blade 14 into the engagement grooves 18 of the disk 15 from the front side. According to the structure, the respective rear moving blades 14 can be easily attached to and detached from the disk 15 from the front side.

In order to integrally attach the spiral blade 13 to the surface of the spinner 16, the spiral blade 13 is structured such that the spinner 16 and the spiral blade 13 are integrally formed by a brisk structure. The spinner 16 is formed as a thick structure such that the spinner 16 can receive a centrifugal force applied to the spiral blade 13 at the time of operating the turbofan engine according to the present invention.

A bolt insertion hole 20 extending in the axial direction is provided in the spinner 16 at a plurality of positions having a desired interval in a circumferential direction corresponding to the interval of the spiral blades 13. A bolt 19 can be inserted into the bolt insertion hole 20 from a front side in the axial direction. On the other hand, a flange 22 having a nut member 21 such as a shank nut is provided at a plurality of positions having a desired interval in a circumferential direction corresponding to the respective bolt insertion holes 20 of the spinner 16, in a front surface side of the disk 15. The bolts 19 is inserted into the respective bolt insertion holes 20 of the spinner 16 from the front side, and then, the respective nut members 21 are tightly screwed to the bolts 19 to fix the spinner 16 to the front surface side of the disk 15. Further, at the same time, the rear end portions of the respective spiral blades 13 in the surface of the spinner 16 can be aligned to the front end portions of the respective rear moving blades 14 attached to the outer circumferential portion of the disk 15. Accordingly, the spinner 16 can be easily attached or detached with respect to the disk 15 from the front side of the engine, by engaging the bolt 19 in bolt insertion hole 20 with the nut member from the front side of the engine, or disengaging the bolt 19 from the nut member toward the front side of the engine.

In this case, when attaching the spinner 16 to the disk 15 as mentioned above, the rear end portion of each of the spiral blades 13 provided in the surface of the spinner 16 is closely contacted with the front end portion of the corresponding rear moving blade 14 attached to the outer circumferential portion of the disk 15, or is arranged close to the front end portion of the corresponding rear moving blade 14 at a desired gap G, as shown in FIG. 3C. In the case where the desired gap G is formed between the rear end portion of each of the spiral blades 13 and the front end portion of the rear moving blade 14, the gap is properly selected within a range in which a very great pressure difference is not generated between front and back sides (a front surface side and a back surface side in a rotational direction) of the first-stage moving blade 12 of the fan even if the gap G exists when the first-stage moving blade 12 of the fan having the divided structure constituted by the spiral blade 13 and the rear moving blade 14 is rotated in accordance with the operation of the turbofan engine according to the present invention. For example, the gap G may be set to about 1 mm.

Further, the spinner 16 is integrally provided with a ring-shaped retainer 23 for contacting with a front end surface of the dovetail portion 17 of each of the rear moving blades 14 attached to the outer circumferential portion of the disk 15. The ring-shaped retainer 23 is positioned at an inner side of the rear end portion of the spinner 16. The retainer 23 presses the front end surface of the dovetail portion 17 of the rear moving blade 14 by fixing the spinner 16 to the disk 15. In other words, since each of the rear moving blades 14 is structured so as to be attached to the disk 15 by making the dovetail portion 17 engage with the engagement groove 18 of the disk 15 from the front side. When each of the rear moving blades 14 rotates in the operation of the turbofan engine according to the present invention, a reaction force of thrust is applied as force for moving forward in the axial direction to each of the rear moving blades 14. However, even in the case where the reaction force of the thrust is applied, it is possible to prevent each of the rear moving blades 14 from moving forward in the axial direction, by the retainer 23 of the spinner 16.

When driving the zero hub tip ratio fan type turbofan engine according to the present invention, the spiral blade 13 in the surface of the spinner 16, that is, the first-stage moving blade 12 of the fan constituted by the spinner integral type moving blade and the rear moving blade 14 is rotated by the output of the turbine. Accordingly, the air flowing into the front surface of the spinner 16 is sucked into the spiral blade 13 that is the spinner integral type moving blade, and flows along each of the spiral blades 13 under the compressed state to be supplied to the corresponding rear moving blade 14 in the rear side.

Accordingly, in the turbofan engine according to the present invention, in the same manner as the zero hub tip ratio fan type turbofan engine shown in FIG. 2, it is possible to use an entire area in the front side of the engine as an air inflow area of the first-stage moving blade 12 of the fan, and it is possible to increase a suction flow rate of the first-stage moving blade 12 of the fan without enlarging the diameter of the fan and the inner diameter of the casing. Further, even in the case where the bypass ratio is made larger, it is possible to keep the diameter of the fan small, and it is possible to reduce the weight of the engine. Further, it is possible to reduce the number of the stages of a low-pressure compressor in the compressor provided in the rear stage to reduce the weight of the engine.

Further, for example, when a part of the rear moving blades 14 is broken due to a bird strike or the like, the rear moving blade 14 can be replaced by a new rear moving blade 14 by loosening the bolt 19 from the front side so as to detach the spinner 16 from the disk 15, and thereafter detaching only the broken rear moving blade 14 from the disk 15. Further, when the spiral blade 13 is broken, the spiral blade 13 can be repaired by detaching the spiral blade 13 integrally with the spinner 16, and thereafter attaching the spinner 16 with a new spiral blade 13. Accordingly, the turbofan engine according to the present invention can be structured so as to have excellent maintainability.

Further, since the spinner 16 is integrally provided with the retainer 23 for preventing the rear moving blade 14 from moving in the axial direction with respect to the disk 15, it is not necessary to independently prepare and attach the retainer member for preventing the rear moving blade 14 from moving. Therefore, it is possible to reduce the number of the members, and it is possible to reduce a labor hour required for the maintaining work.

Figure 4A:
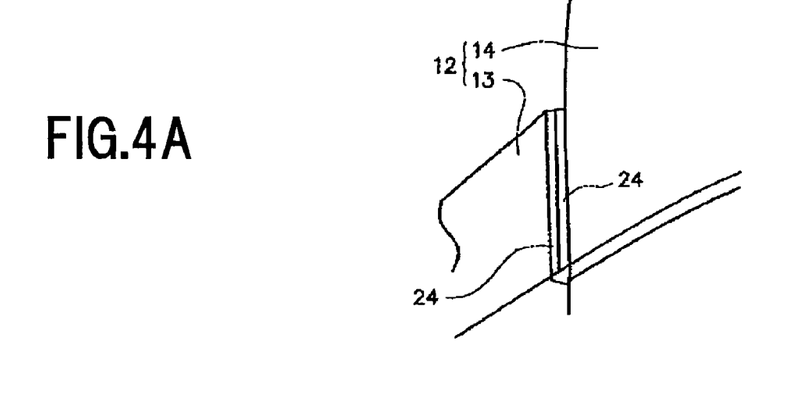
FIG. 4A is a view showing a first-stage moving blade of the fan according to another embodiment of the present invention, and corresponds to FIG. 1C.

Next, FIGS. 4A, 4B and 4C show application examples of the embodiment shown in FIGS. 3A, 3B and 3C. The example shown in FIG. 4A is structured such that a cushioning member 24 for sealing made of a rubber, a soft material or the like is attached to each of the rear end edge portion of the spiral blade 13 in each of the first-stage moving blades 12 of the fan of the zero hub tip ratio fan 10a shown in FIGS. 3A, 3B and 3C, and the front end edge portion close to the base of the rear moving blade 14 corresponding to the portion facing to the rear end edge portion of the spiral blade 13. Each of the cushioning members 24 for sealing is closely contacted with each other when the rear end portion of the spiral blade 13 is arranged close to the front end portion of the rear moving blade 14 in the outer circumferential portion of the disk 15 by attaching the spinner 16 to the disk 15, thereby closing the gap between both the elements. Accordingly, it is possible to prevent a risk that the air flow flowing along the front surface side in the rotational direction of the first-stage moving blade 12 of the fan escapes toward the back surface side in the rotational direction through the gap between the spiral blade 13 and the rear moving blade 14 at the time of driving the engine.

Figure 4B:
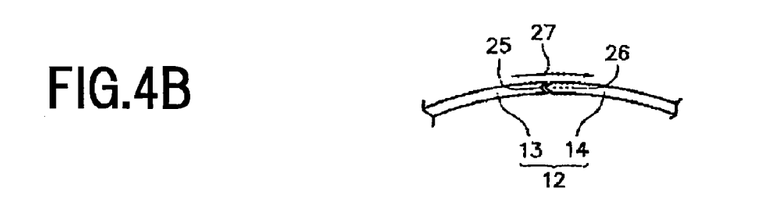
FIG. 4B is a view showing a cross section of a rear end portion of a spiral blade and a front end portion of a rear moving blade in an enlarged manner.

Further, the example shown in FIG. 4B is structured such that a concave groove 25 extending along a direction of a blade length (a blade height) is formed in the rear end surface of the spiral blade 13 in each of the first-stage moving blades 12 of the fan of the zero hub tip ratio fan 10a shown in FIGS. 3A, 3B and 3C, a protruding portion 26 capable of fitting to the groove 25 is provided in the front end surface close to the base of the rear moving blade 14 facing to the rear end surface of the spiral blade 13, and the protruding portion 26 of the rear moving blade 14 somewhat enters into the concave groove 25 in the rear end surface of the spiral blade 13 when the rear end portion of the spiral blade 13 is arranged close to the front end portion of the rear moving blade 14 in the outer circumferential portion of the disk 15 by attaching the spinner 16 to the disk 15, thereby preventing the gap formed between the spiral blade 13 and the rear moving blade 14 from linearly communicating with the front surface side and the back surface side in the rotational direction.

Figure 4C:
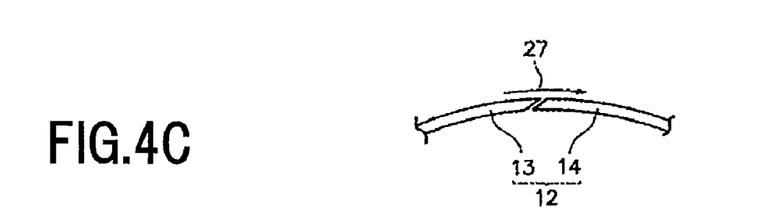
FIG. 4C is a view showing a cross section of a rear end portion of a spiral blade and a front end portion of a rear moving blade in an enlarged manner.

Further, the example shown in FIG. 4C is structured such that the rear end portion of the spiral blade 13 in each of the first-stage moving blades 12 of the fan of the zero hub tip ratio fan 10a shown in FIGS. 3A, 3B and 3C is formed as an end surface shape inclined such that the front surface side in the rotational direction protrudes at a desired dimension from the back surface side, and the front end portion close to the base of the rear moving blade 14 facing to the rear end portion of the spiral blade 13 is formed as an end surface shape inclined such that the back surface side in the rotational direction protrudes at a desired dimension from the front surface side. The rear end portion of the spiral blade 13 and the front end portion close to the base of the rear moving blade 14 somewhat overlap in the front-to-back direction in the rotational direction when the rear end portion of the spiral blade 13 is arranged close to the front end portion of the rear moving blade 14 in the outer circumferential portion of the disk 15 by attaching the spinner 16 to the disk 15. Thereby, the opening position in the front surface side in the rotational direction of the gap formed between both the elements 13 and 14 can be arranged in a rear side in an axial direction in comparison with the opening position in the back surface side in the rotational direction.

According to the embodiments shown in FIGS. 4B and 4C, it is possible to suppress the risk that the air flow 27 flowing at the front surface side in the rotational direction of the first-stage moving blade 12 of the fan at the time of driving the engine escapes toward the back surface side in the rotational direction through the gap between the spiral blade 13 and the rear moving blade 14.

Accordingly, the structures shown in FIGS. 4A, 4B and 4C can suppress the turbulence of the air flow caused by the divided structure in which the first-stage moving blade 12 of the fan in the zero hub tip ratio fan 10a is constituted by the spiral blade 13 and the rear moving blade 14.

Figure 5:
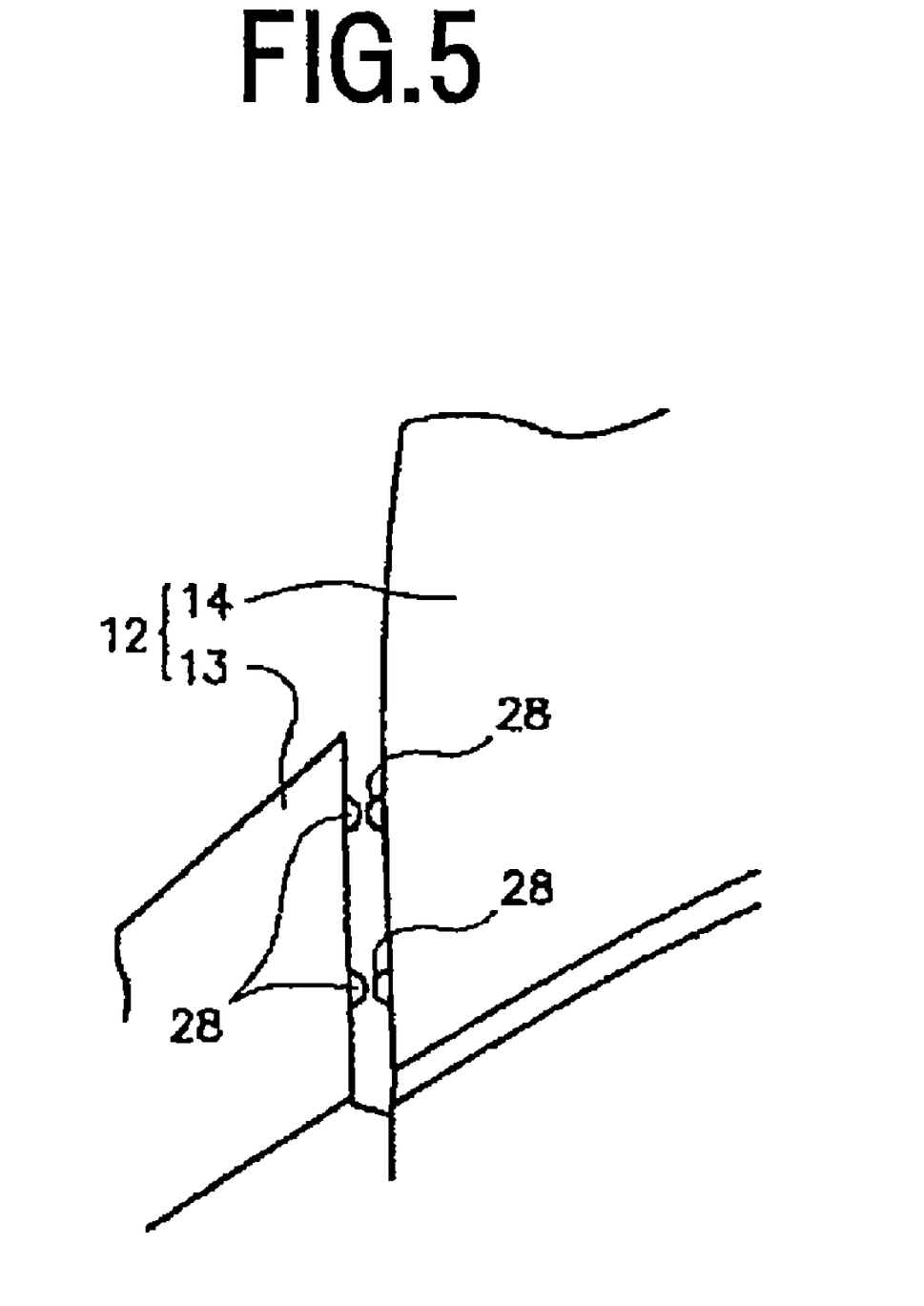
FIG. 5 is a view showing another embodiment according to the present invention, and corresponds to FIG. 3C.

Next, FIG. 5 shows another embodiment according to the present invention. In the same structures shown in FIGS. 3A, 3B and 3C, vibration interfering projections 28 colliding with each other when the different blade vibrations are generated in the spiral blade 13 and the rear moving blade 14 at the time of driving the engine are respectively provided in one or more corresponding positions (two positions in the drawing) in a front-to-rear direction of the rear end portion of the spiral blade 13 in each of the first-stage moving blades 12 of the fan of the zero hub chip ratio fan 10a and the front end portion close to the base of the rear moving blade 14. In this case, the vibration interfering projection 28 may be formed in an approximately semicircular shape, a rectangular shape or the like, that is, the shape may be freely set (the approximately semicircular shape is shown as one example in the drawing).

The other structures are the same as those shown in FIGS. 3A, 3B and 3C, and the same reference numerals are attached to the same elements.

According to the this embodiment, even if the different blade vibrations are generated in the spiral blade 13 and the rear moving blade 14 at the time of driving the engine, it is possible to absorb vibration energy in the vibration of the spiral blades 13 and the rear moving blade 14, by making the vibration interfering projections 28 interfere with each other. Accordingly, it is possible to suppress increase of the blade vibration caused by setting the first-stage moving blade 12 of the fan of the zero hub tip ratio fan 10a as the divided structure constituted by the spiral blade 13 and the rear moving blade 14.

Figure 6:
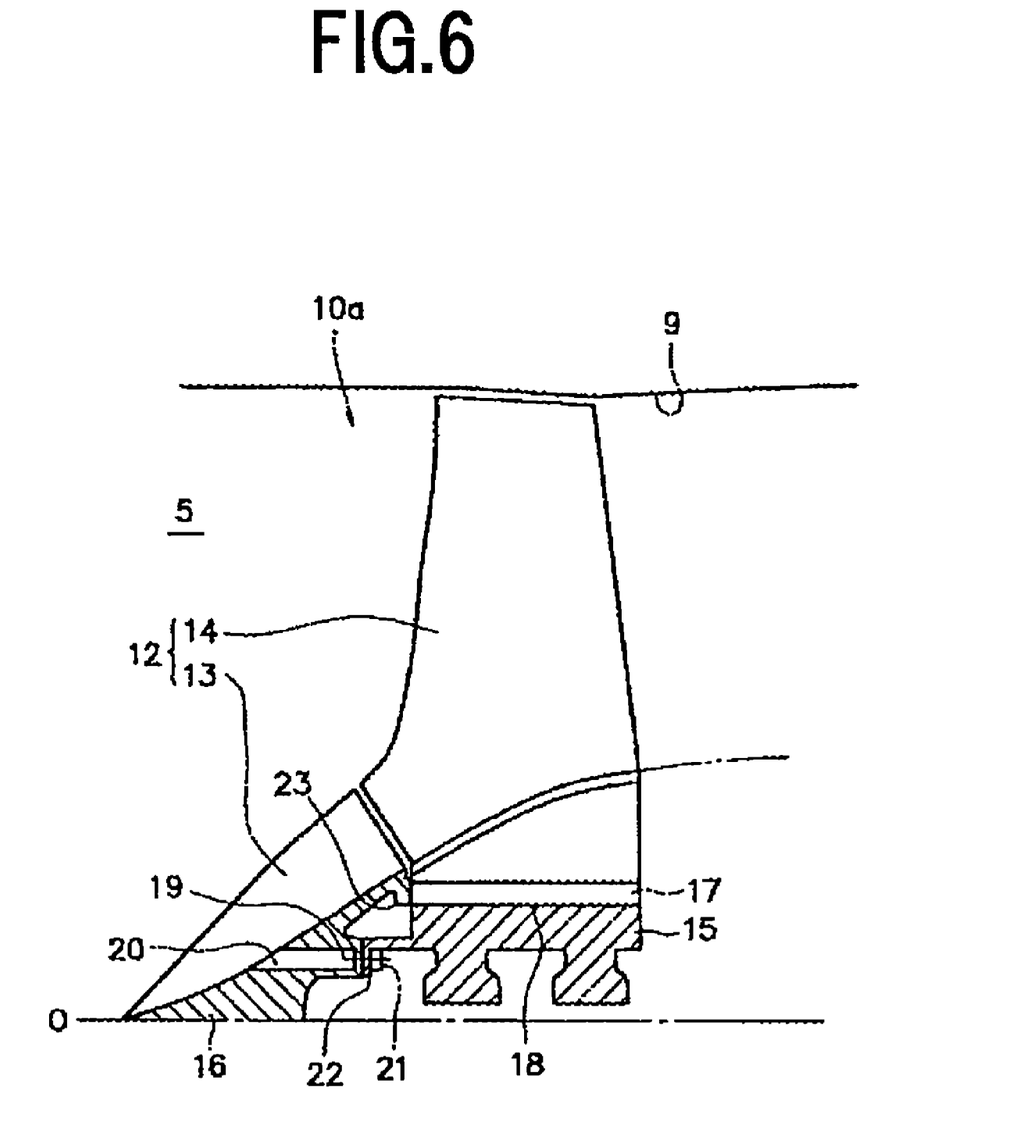
FIG. 6 is a schematic sectional side view showing another embodiment according to the present invention.

The present invention is not limited to the embodiment mentioned above. In the embodiments in FIGS. 3A, 3B and 3C, there is shown the case that the position dividing the first-stage moving blade 12 of the fan of the zero hub tip ratio fan 10a into the spiral blade 13 and the rear moving blade 14 is set along the direction approximately perpendicular to the axial direction. However, the dividing position can be freely set while taking into consideration stresses respectively applied to the spiral blade 13 and the rear moving blade 14 at the time of driving the engine, easiness for working or the like. For example, the spiral blade 13 and the rear moving blade 14 are divided obliquely with respect to the axial direction, as shown in FIG. 6.

Figure 7:
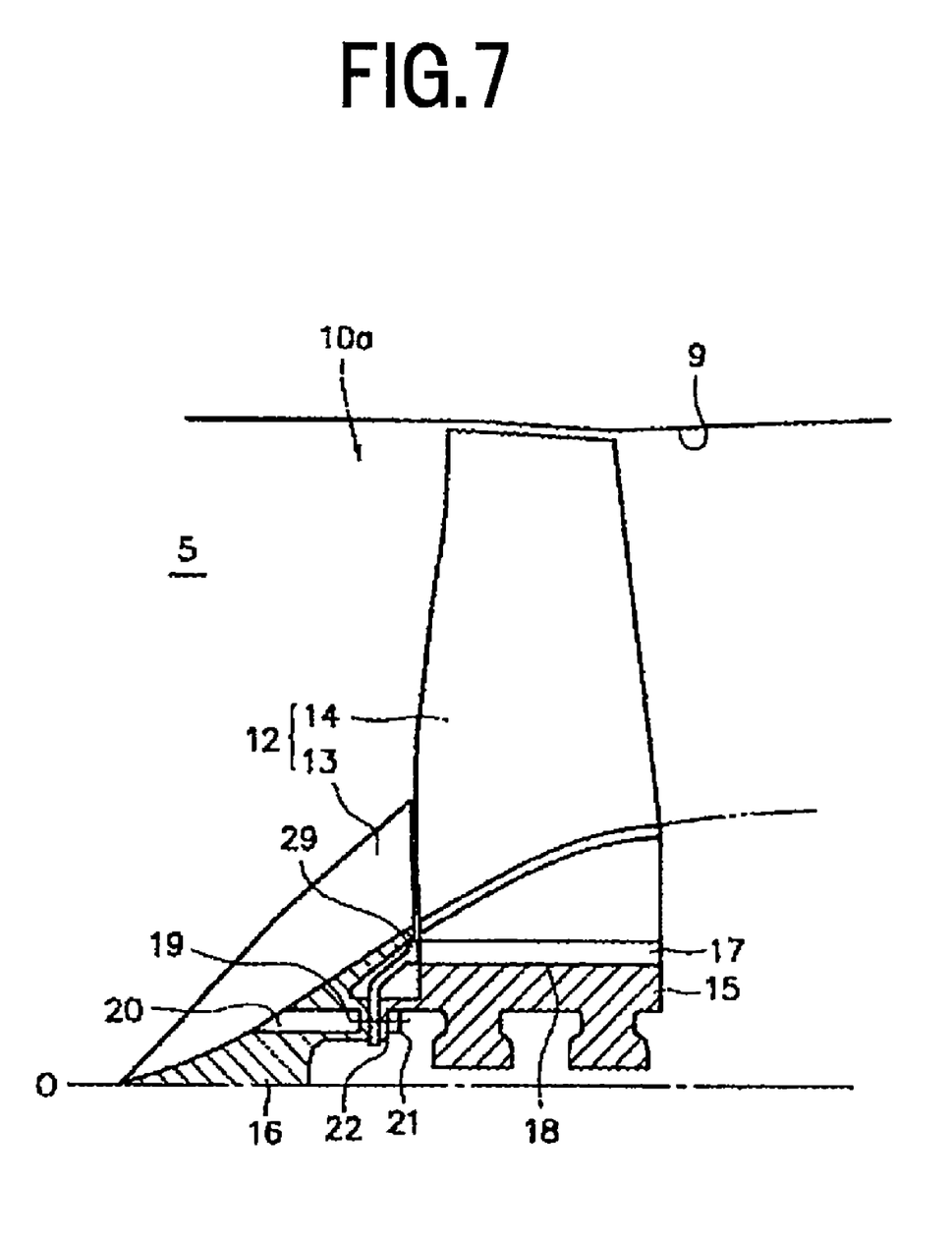
FIG. 7 is a schematic sectional side view showing another embodiment according to the present invention.

As shown in the embodiment in FIGS. 3A, 3B and 3C, to reduce the number of the members, it is desirable that the retainer 23 for preventing the movement of the rear moving blade 14 in the axial direction is integrally provided with the spinner 16. However, the structure may be made, as shown in FIG. 7, such that a ring-shaped retainer member 29 is independently provided for contacting with the front end surface of the dovetail portion 17 of the rear moving blade 14. For example, the ring-shaped retainer member 29 is attached by utilizing a bolt 19 that is used for attaching the spinner 16 to the flange 22 of the disk 15.

In the attachment of the rear moving blade 14 to the disk 15, it is possible to employ mounting means other than the type of engaging the dovetail portion 17 of the rear moving blade 14 with the engagement groove 18 of the disk 15 as far as it is possible to detachably mount the rear moving blade 14 one by one to the outer circumferential portion of the disk 15. For example, in the attachment of the rear moving blade 14 to the disk 15, a pin joint or the like may be used. Furthermore, the rear moving blade 14 of the first-stage moving blade 12 of the fan of the zero hub tip ratio fan 10a may have a forward moving blade shape protruding forward in the tip side. Thus, the embodiments may be variously modified within the scope of the present invention.

What is claimed is:

1. A turbofan engine having a fan on a front side thereof and a turbine driving the fan, the turbofan engine further comprising: a disk rotationally driven by the turbine; a spinner detachably mounted at a front side of the disk;
   a spiral blade integrally mounted on a surface of the spinner, wherein the spiral blade is spirally extended to an axial position of a front end portion of the spinner; and a rear moving blade detachably mounted on an outer circumferential surface of the disk at the downstream side of the spiral blade;
   wherein the spiral blade and the rear moving blade form a first-stage moving blade of the fan,
   the spiral blade has a rear end having a first radial height defined with respect to an axis of the engine, and
   the rear moving blade has a second radial height, defined with respect to the axis, that is greater than the first radial height.

2. A turbofan engine having a fan on a front side thereof and a turbine driving the fan, the turbofan engine further comprising:
   a disk that is rotationally driven by the turbine and that has an engagement groove extending in an axial direction at a plurality of positions of an outer circumferential portion thereof;
   a rear moving blade at the downstream side of the spiral blade, wherein the rear moving blade includes a base portion having a dovetail portion extending in a front-to-rear direction, the dovetail portion is detachably fitted into the engagement groove from a front side;
   a spinner detachably mounted at a front side of the disk; and
   a spiral blade integrally mounted on a surface of the spinner, wherein the spiral blade is spirally extended to an axial position of a front end portion of the spinner;
   wherein the spiral blade and the rear moving blade form a first-stage moving blade of the fan,
   the spiral blade has a rear end having a first radial height defined with respect to an axis of the engine, and
   the rear moving blade has a second radial height, defined with respect to the axis, that is greater than the first radial height.

3. A turbofan engine according to claim 2, further comprising a retainer integrally provided in a rear end portion of the spinner so that the dovetail portion of the rear moving blade fitted into the engagement groove from the front side is prevented from being displaced to the front side.

4. A turbofan engine according to claim 1, further comprising a cushioning member for sealing in a rear end edge portion of the spiral blade and in a front end edge portion close to a base of the rear moving blade.

5. A turbofan engine according to claim 1, further comprising:
   a first vibration interfering projection at one or more positions in the rear end portion of the spiral blade; and
   a second vibration interfering projection at one or more positions at a front end portion close to a base of the rear moving blade, wherein the second vibration interfering projection collides with the first vibration interfering projection when blade vibration occurring at the spiral blade and the rear moving blade is different therebetween.

6. A turbofan engine according to claim 2, further comprising a cushioning member for sealing in a rear end edge portion of the spiral blade and in a front end edge portion close to a base of the rear moving blade.

7. A turbofan engine according to claim 2, further comprising:
   a first vibration interfering projection at one or more positions in the rear end portion of the spiral blade; and
   a second vibration interfering projection at one or more positions at a front end portion close to a base of the rear moving blade, wherein the second vibration interfering projection collides with the first vibration interfering projection when blade vibration occurring at the spiral blade and the rear moving blade is different therebetween.

8. A turbofan engine according to claim 1 having a hub tip ratio of approximately zero.

9. A turbofan engine according to claim 2 having a hub tip ratio of approximately zero.

10. A turbofan engine according to claim 8, wherein the turbofan engine is a high bypass turbofan engine.

11. A turbofan engine according to claim 9, wherein the turbofan engine is a high bypass turbofan engine.

12. A turbofan engine according to claim 1, wherein a concave groove is formed in the rear end surface of the spiral blade, and a protruding portion is provided in the front end surface of the rear moving blade such that the protruding portion enters the concave groove.

13. A turbofan engine according to claim 2, wherein a concave groove is formed in the rear end surface of the spiral blade, and a protruding portion is provided in the front end surface of the rear moving blade such that the protruding portion enters the concave groove.

* * * * *